United States Patent
Soulie et al.

[15] 3,692,108
[45] Sept. 19, 1972

[54] PROPELLING DEVICES FOR TOOLS TO LOWER OR RAISE SAFETY APPLIANCES IN OIL WELLS

[72] Inventors: Guy Soulie, No. 6, La Charlotte, 64 Billere; Gerard Lozach, 39-45, avenue du Nord, 93 Neuilly-plaisance, both of France

[22] Filed: April 15, 1971

[21] Appl. No.: 134,184

[30] Foreign Application Priority Data

April 17, 1970 France..................7013942

[52] U.S. Cl...............................................166/153
[51] Int. Cl. ............................................E21b 33/127
[58] Field of Search..................166/153, 155, 170; 15/104.06 R, 104.06 A

[56] References Cited

UNITED STATES PATENTS

| | | |
|---|---|---|
| 3,050,130 | 8/1962 | Culver et al. .........166/170 X |
| 3,052,302 | 9/1962 | Lagucki.....................166/153 |
| 3,506,068 | 4/1970 | Brown et al. ...............166/153 |
| 3,419,074 | 12/1968 | Brown....................166/153 X |

*Primary Examiner*—David H. Brown
*Attorney*—Holcombe, Wetherill & Brisebois

[57] ABSTRACT

A hydraulic propelling device for oil-well tools, consisting of a hollow cylindrical body containing radial openings of small diameter, and characterized by the fact that a membrane of elastically deformable material, both ends of which are embedded in the said hollow cylindrical body, is equipped with one series of metal fittings, attached round the middle at right angles to the axis of the propelling device, with two other series of metal fittings on each side of this first series.

6 Claims, 3 Drawing Figures

PROPELLING DEVICES FOR TOOLS TO LOWER OR RAISE SAFETY APPLIANCES IN OIL WELLS

The present invention concerns a hydraulic propelling device for tools to lower or raise safety devices in oil wells.

Safety devices can be installed in underwater oil or gas wells by means of tools, pushed along a pipe by hydraulic pressure. These tools are pushed by propelling devices, which are units with flexible sealing gasket, this gasket pressing against the wall of the pipe inside which the propelling device moves, as the result of the hydraulic pressure exerted on the said gasket. Unfortunately, the gasket tends to wear out through rubbing, and recent improvements have consisted of reinforcing this gasket with steel runners.

The present invention relates to a device ensuring more or less permanent contact between at least part of the length of the outer wall of the propelling device and the inner wall of the pipe along which this propelling device is moving.

The propelling device for tools to lower or raise safety appliances in oil wells according to the present invention consists of a hollow body, generally cylindrical in shape, open at both ends and surrounded by packing composed of an elastomer tubing carrying rigid fittings which are pressed outwards radially under the pressure of fluid entering the hollow part of the body and passing through the apertures in the walls of the said body.

The propelling device according to the present invention is characterized by the fact that the flexible tubing is fixed hermetically to the hollow body at both ends, and that the metal fittings attached to the outer surface of this tubing consist of one series of fittings round the middle of the hollow body at right angles to its axis, in the form of segments of a ring separated by small spaces, and, on each side of the first series of fittings, another series of elongated lengthwise fittings, one end of which is in contact with the matching frontal surface of the ring segments.

The invention will be more easily understood from the following description of one embodiment, illustrated by the accompanying figures.

Figure 1:
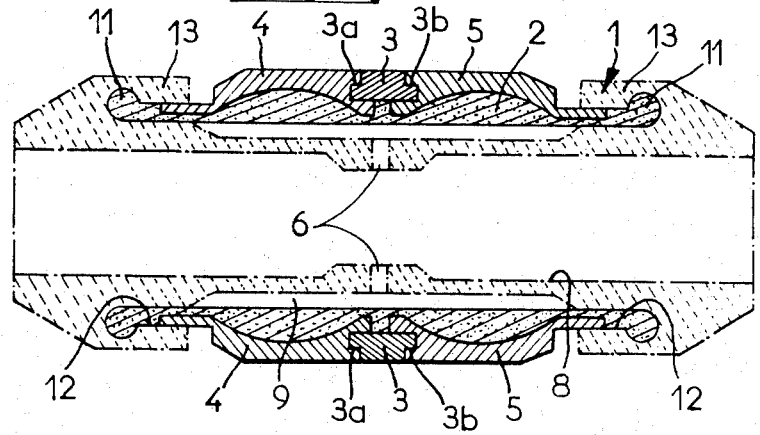
FIG. 1 represents a cross-sectional view of the propelling device.

In FIG. 1, a propelling device body 1, generally hollow cylindrical in shape, carries a membrane forming a flexible outer tubing 2, made from neoprene, for instance. Metal fittings 3 are welded or glued to this tubing 2. These fittings, of which there are eight in the embodiment of the invention shown here, are shaped like the segments of a ring. When at rest, these segments are not in contact, but leave spaces 7 between them, about a millimeter wide. Tools normally used measure 60 to 100 mm in diameter.

Two series of elongated fittings 4 and 5 are fixed on each side of these ring segments 3, against their edges. There are 16 fittings in each of these series 4 and 5. Every second fitting in each series is placed opposite the spaces 7 left between the ring segments. Openings 6 provide communicating passages between the central cavity 8 of the propelling device 1 and an annular chamber 9, provided between the main body and the tubing 2.

Figure 2:
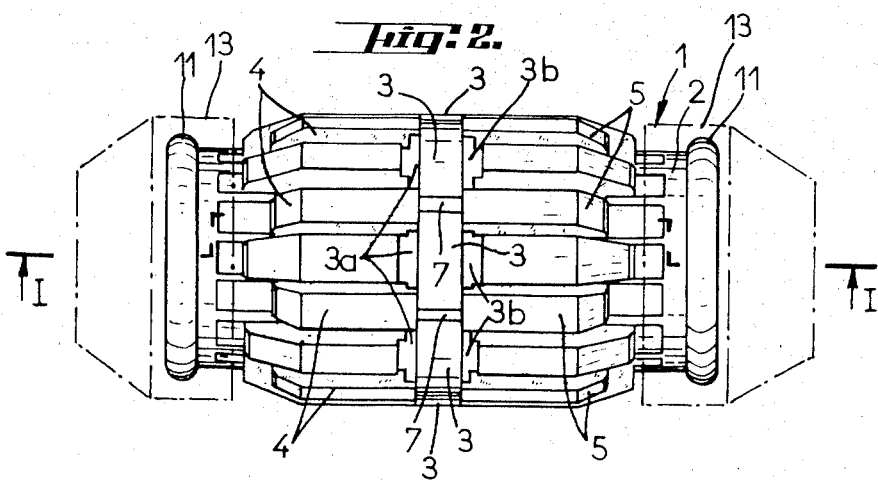
FIG. 2 represents a view from the outside of the membrane carrying the metal fittings, on the propelling device shown in FIG. 1.

FIG. 2 shows how the metal fittings are assembled. The ring segments 3 and elongated fittings 4 and 5 can be seen clearly, as well as the rims 11 which anchor the deformable tubing 2 to the body of the device.

Figure 3:
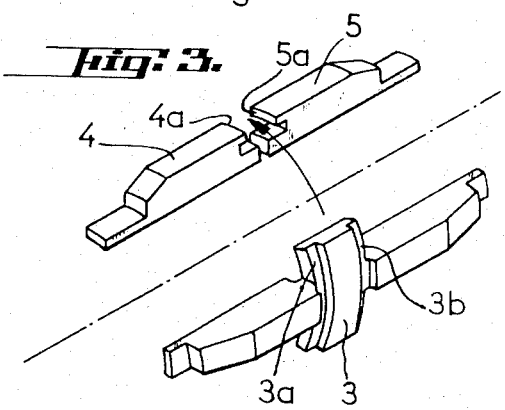
FIG. 3 shows how the fittings fit together.

FIG. 3 shows how the fittings fit together. In particular, one can see the shape of the ring segments 3, with, on each side of a central reinforcing section, two rims 3a and 3b, the ends of which, next to the spaces 7, fit loosely into slots 4a and 5a, in alternate elongated fittings 4 and 5. This slot may be seen in the upper part of FIG. 3. The remaining elongated fittings press against the rims of the ring segments as shown in the lower part of FIG. 3.

The other end of each lengthwise fitting 4 and 5, away from the center, is embedded with the corresponding end of the tubing 2 in a ring-shaped groove 12, which forms part of a wider section 13 at the corresponding end of the body 1.

This propelling device operates as follows. The device is first attached to a raising or lowering tool which is to install or remove a safety appliance in an oil well.

The tool assembly is inserted into a continuous pipe running to the bottom of the well, and fluid under pressure is injected into the pipe behind the propelling device, pushing it along. This fluid passes through the openings 6 into the annular chamber 9, where it dilates the deformable tubing 2, pressing the fittings attached to this tubing against the inner wall of the pipe.

If there are variations in the inside diameter of the pipe, the metal fittings 3, 4 and 5 shift slightly in relation to one another, to match such variations, and continue to press against the pipe wall. In particular, it may be seen that they are articulated, and that at least one of the series of fittings constantly presses against the inner wall of the pipe. This means that there is a more or less uniform holding force, whatever the inside diameter of the pipe. The flexibility of the tubing means that the fittings 3 can move apart or together, thus increasing or reducing the nominal diameter of the gasket.

This propelling device can also be connected to maintenance tools, such as paraffin-removing blades or scrapers.

What is claimed is:

1. A propelling device for tools to lower or raise safety appliances in oil wells, consisting of a hollow body, generally cylindrical in shape, open at both ends and surrounded by packing composed of an elastomer tubing carrying rigid fittings which are pressed outwards radially under the pressure of fluid entering the hollow part of the body and passing through apertures in the walls of the said body, characterized by the fact that the flexible tubing 2 is fixed hermetically to the hollow body 1 at both ends, and that the metal fittings attached to the outer surface of the said tubing consist of one series of fittings 3 round the middle of the hollow body at right angles to its axis, in the form of segments of a ring separated by small spaces 7, and, on each side of this first series of fittings, another series of elongated lengthwise fittings 4, 5, one end of which is in contact with the matching frontal surface of the ring segments.

2. A propelling device according to claim 1, characterized by the fact that the other end of each lengthwise fitting 4 or 5, away from the center, is embedded with the corresponding end of the tubing 2 in a ring-shaped groove 12, which forms part of a wider section 13 at the corresponding end of the hollow body of the device.

3. A propelling device according to claim 1, characterized by the fact that, opposite each space 7 between two central fittings 3, is placed a lengthwise fitting 4 or 5, which is wider than the said space.

4. A propelling device according to claim 2, characterized by the fact that, between every two lengthwise fittings 4 or 5 opposite a space 7 between two central fittings 3, there is at least one other lengthwise fitting 4 or 5.

5. A propelling device according to claim 2, characterized by the fact that the end of each lengthwise fitting 4 or 5 opposite a space 7 between two central fittings 3 is fork-shaped 4a or 5a, and fits loosely to part of the section of the ends of the two adjoining central fittings 3.

6. A propelling device according to claim 2, characterized by the fact that the central fittings 3 have a T-shaped cross-section, the central section extending outwards from the tubing 2, and only the two arms of the T fitting inside the fork-shaped ends 4a and 5a of the lengthwise fittings 4 and 5.

* * * * *

UNITED STATES PATENT OFFICE
CERTIFICATE OF CORRECTION

Patent No. 3,692,108    Dated September 19, 1972

Inventor(s) GUY SOULIE and GERARD LOZACH

It is certified that error appears in the above-identified patent and that said Letters Patent are hereby corrected as shown below:

[73]   Assignee:   ENTREPRISE DE RECHERCHES & D'ACTIVITES
                   PETROLIERES (ELF), Paris, France Signed and sealed this 13th day of March 1973.

(SEAL)
Attest:

EDWARD M.FLETCHER,JR.                ROBERT GOTTSCHALK
Attesting Officer                    Commissioner of Patents